(12) United States Patent
Zaman et al.

(10) Patent No.: US 11,902,314 B2
(45) Date of Patent: Feb. 13, 2024

(54) UTILIZING MODELS TO INTEGRATE DATA FROM MULTIPLE SECURITY SYSTEMS AND IDENTIFY A SECURITY RISK SCORE FOR AN ASSET

(71) Applicant: Accenture Global Solutions Limited, Dublin (IE)

(72) Inventors: Md. Faisal Zaman, Drumcondra (IE); Andrew Poole, Dublin (IE); Gaurav Shivhare, Dublin (IE); Sneha Shinde, Dublin (IE); Grant Kevin Harris, Grosse Pointe Woods, MI (US); Jeffrey Mark Recor, Rochester, MI (US)

(73) Assignee: Accenture Global Solutions Limited, Dublin (IE)

( * ) Notice: Subject to any disclaimer, the term of this patent is extended or adjusted under 35 U.S.C. 154(b) by 368 days.

(21) Appl. No.: 17/444,341

(22) Filed: Aug. 3, 2021

(65) Prior Publication Data
US 2023/0042671 A1 Feb. 9, 2023

(51) Int. Cl.
*H04L 9/40* (2022.01)
*H04L 41/22* (2022.01)
*H04L 41/12* (2022.01)

(52) U.S. Cl.
CPC .......... *H04L 63/1433* (2013.01); *H04L 41/22* (2013.01); *H04L 63/1416* (2013.01); *H04L 63/1441* (2013.01); *H04L 41/12* (2013.01); *H04L 63/20* (2013.01)

(58) Field of Classification Search
CPC . H04L 63/1433; H04L 41/22; H04L 63/1416; H04L 63/1441

USPC .......................................................... 726/25
See application file for complete search history.

(56) References Cited

U.S. PATENT DOCUMENTS

| | | | |
|---|---|---|---|
| 10,681,060 B2 * | 6/2020 | Scheidler | G06N 20/00 |
| 2011/0138471 A1 * | 6/2011 | Van De Weyer | H04L 63/1433 726/25 |
| 2014/0137257 A1 * | 5/2014 | Martinez | H04L 63/1433 726/25 |

(Continued)

OTHER PUBLICATIONS

Akram et al., "Unified Model for Data Security—A Position Paper*," Website: www.merriam-webster.com/dictionary/data, Sep. 2014, 10 Pages.

(Continued)

*Primary Examiner* — Teshome Hailu
(74) *Attorney, Agent, or Firm* — Harrity & Harrity, LLP

(57) ABSTRACT

A device may receive security data identifying assets of an entity, security issues associated with the assets, and objectives associated with the assets and may utilize a data model to generate, based on the security data, asset related data identifying mapped sets of security data. The device may process a first portion of the asset related data, with a first model, to calculate an asset risk likelihood score for an asset of the assets and may process a second portion of the asset related data, with a second model, to calculate an asset criticality score for the asset. The device may process a third portion of the asset related data, with a third model, to calculate an asset control effectiveness score for the asset and may combine the scores to generate a security risk score for the asset. The device may provide the security risk score for display.

20 Claims, 10 Drawing Sheets

(56) References Cited

U.S. PATENT DOCUMENTS

| | | | | |
|---|---|---|---|---|
| 2015/0205954 A1* | 7/2015 | Jou | ............ | G06F 21/316 |
| | | | | 726/22 |
| 2019/0044969 A1* | 2/2019 | Pilkington | ............ | H04L 63/1433 |
| 2019/0182289 A1* | 6/2019 | White | ............ | G06N 20/00 |
| 2021/0360032 A1* | 11/2021 | Crabtree | ............ | G06F 16/2477 |

OTHER PUBLICATIONS

"What is a Unified Data Model, and Why Would You Use It?—AI-Driven IT Operations Management (ITOM) Blog," Mar. 4, 2019, 3 Pages.

\* cited by examiner

UTILIZING MODELS TO INTEGRATE DATA FROM MULTIPLE SECURITY SYSTEMS AND IDENTIFY A SECURITY RISK SCORE FOR AN ASSET

BACKGROUND

Cyber risk management is the process of identifying, analyzing, evaluating, and addressing cyber security threats to assets of an entity. A first part of a cyber risk management program is a cyber risk assessment.

SUMMARY

Some implementations described herein relate to a method. The method may include receiving security data identifying a plurality of assets of an entity, a plurality of security issues associated with the plurality of assets, and objectives associated with the plurality of assets, and utilizing a data model to generate, based on the security data, asset related data identifying mapped sets of security data. The method may include processing a first portion of the asset related data, with an asset risk likelihood model, to calculate an asset risk likelihood score for an asset of the plurality of assets, and processing a second portion of the asset related data, with an asset criticality model, to calculate an asset criticality score for the asset. The method may include processing a third portion of the asset related data, with an asset control effectiveness model, to calculate an asset control effectiveness score for the asset, and combining the asset risk likelihood score, the asset criticality score, and the asset control effectiveness score to generate a security risk score for the asset. The method may include providing the security risk score for display.

Some implementations described herein relate to a device. The device may include one or more memories and one or more processors coupled to the one or more memories. The one or more processors may be configured to receive security data identifying a plurality of assets of an entity, a plurality of security issues associated with the plurality of assets, and objectives associated with the plurality of assets, and generate, based on the security data, asset related data identifying mapped sets of security data. The one or more processors may be configured to process a first portion of the asset related data, with an asset risk likelihood model, to calculate an asset risk likelihood score for an asset of the plurality of assets, and process a second portion of the asset related data, with an asset criticality model, to calculate an asset criticality score for the asset. The one or more processors may be configured to process a third portion of the asset related data, with an asset control effectiveness model, to calculate an asset control effectiveness score for the asset, and combine the asset risk likelihood score, the asset criticality score, and the asset control effectiveness score to generate a security risk score for the asset. The one or more processors may be configured to perform one or more actions based on the security risk score.

Some implementations described herein relate to a non-transitory computer-readable medium that stores a set of instructions for a device. The set of instructions, when executed by one or more processors of the device, may cause the device to receive security data identifying a plurality of assets of an entity, a plurality of security issues associated with the plurality of assets, and objectives associated with the plurality of assets. The security data may include data identifying one or more of vulnerabilities associated with the plurality of assets, common weaknesses associated with the plurality of assets, security threats associated with the plurality of assets, attack patterns associated with the security threats, security controls associated with the plurality of assets, asset control objectives associated with the plurality of assets, configuration information associated with the plurality of assets, business impact scores associated with the plurality of assets, personal identification information associated with the plurality of assets, or penetration test results associated with the plurality of assets. The set of instructions, when executed by one or more processors of the device, may cause the device to utilize a data model to generate, based on the security data, asset related data identifying mapped sets of security data, and process a first portion of the asset related data, with an asset risk likelihood model, to calculate an asset risk likelihood score for an asset of the plurality of assets. The set of instructions, when executed by one or more processors of the device, may cause the device to process a second portion of the asset related data, with an asset criticality model, to calculate an asset criticality score for the asset, and process a third portion of the asset related data, with an asset control effectiveness model, to calculate an asset control effectiveness score for the asset. The set of instructions, when executed by one or more processors of the device, may cause the device to combine the asset risk likelihood score, the asset criticality score, and the asset control effectiveness score to generate a security risk score for the asset, and perform one or more actions based on the security risk score.

DETAILED DESCRIPTION

Figure 1A:
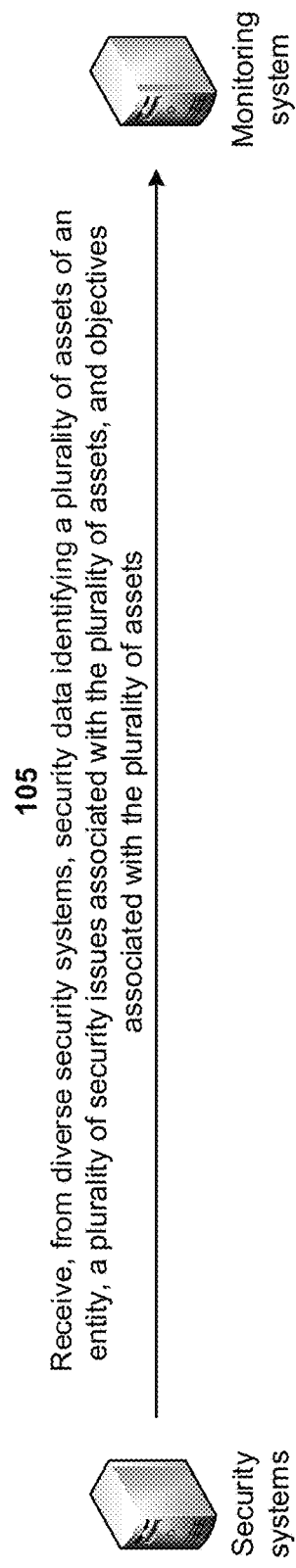
FIGS. 1A-1F are diagrams of an example implementation described herein.

The following detailed description of example implementations refers to the accompanying drawings. The same reference numbers in different drawings may identify the same or similar elements.

An entity (e.g., a business) may have access to data relating to assets, vulnerabilities of the assets, and security threats to the assets. However, such data may not be correlated, which results in issues associated with prioritizing to which assets to direct security investment and understanding the impact of these security investments. Several security systems exist to provide risk mitigation and visibility across the entity. However, such security systems fail to provide a clear depiction of results to be achieved based on security risk data produced by the security systems. This results in an abundance of disconnected data that fails help an entity prioritize areas of security actions and track return on investment for security actions. Therefore, current techniques for monitoring and managing security risks to assets consume computing resources (e.g., processing resources, memory resources, communication resources, and/or the like), networking resources, and/or the like associated with exposing assets to security risks, providing incorrect recommendations associated with security risks, losing opportunities for the business based on assets rendered inoperable by security risks, correcting the inoperable assets, and/or the like.

Some implementations described herein relate to a monitoring system that utilizes models to integrate data from multiple security systems and identify a security risk score for an asset. For example, the monitoring system may receive security data identifying a plurality of assets of an entity, a plurality of security issues associated with the plurality of assets, and objectives associated with the plurality of assets, and may utilize a data model to generate, based on the security data, asset related data identifying mapped sets of security data. The monitoring system may process a first portion of the asset related data, with an asset risk likelihood model, to calculate an asset risk likelihood score for an asset of the plurality of assets, and may process a second portion of the asset related data, with an asset criticality model, to calculate an asset criticality score for the asset. The monitoring system may process a third portion of the asset related data, with an asset control effectiveness model, to calculate an asset control effectiveness score for the asset, and may combine the asset risk likelihood score, the asset criticality score, and the asset control effectiveness score to generate a security risk score for the asset. The monitoring system may provide the security risk score for display.

In this way, the monitoring system utilizes models to integrate data from multiple security systems and identify a security risk score for an asset. The monitoring system may provide a unified view of security risks associated with an asset of an entity by mapping data from diverse security systems (e.g., security operations data, business impact data, asset configuration data, and/or the like). The monitoring system may map the data from the security systems to identify asset level data. The monitoring system may utilize the asset level data to determine a security risk score for the asset. This, in turn, conserves computing resources, networking resources, and/or the like that would otherwise have been consumed in exposing assets to security risks, providing incorrect recommendations associated with security risks, losing opportunities for the business based on assets rendered inoperable by security risks, correcting the inoperable assets, and/or the like.

FIGS. 1A-1F are diagrams of an example 100 associated with utilizing models to integrate data from multiple security systems and identify a security risk score for an asset. As shown in FIGS. 1A-1F, example 100 includes security systems and a monitoring system. Each of the security systems may include a computing device, a server device, a cloud-based device, and/or the like. The monitoring system may include a system that utilizes models to integrate data from multiple security systems and identify a security risk score for an asset. Further details of the security systems and the monitoring system are provided elsewhere herein.

As shown in FIG. 1A, and by reference number 105, the monitoring system may receive, from diverse security systems, security data identifying a plurality of security issues associated with a plurality of assets of an entity. The security data may include data identifying vulnerabilities associated with the plurality of assets, common weaknesses associated with the plurality of assets, security threats associated with the plurality of assets, attack patterns associated with the security threats, security controls associated with the plurality of assets, asset control objectives associated with the plurality of assets, configuration information associated with the plurality of assets, business impact scores associated with the plurality of assets, personal identification information associated with the plurality of assets, penetration test results associated with the plurality of assets, and/or the like.

The data identifying the vulnerabilities associated with the plurality of assets may be received from a vulnerability database. The data identifying the common weaknesses associated with the plurality of assets may be received from a common weakness enumeration database. The data identifying the security threats associated with the plurality of assets may be received from a system that tracks historical security threats for the plurality of assets. The data identifying the attack patterns associated with the security threats may be received from a system that tracks attack patterns on the plurality of assets. The data identifying the security controls associated with the plurality of assets may be received from a system that tracks security controls for the plurality of assets. The data identifying the asset control objectives associated with the plurality of assets may be received from a system that tracks compliance objectives for the plurality of assets. The data identifying the configuration information associated with the plurality of assets may be received from a database that stores data identifying owners of the plurality of assets, roles of the owners at the entity, costs of the plurality of assets, configurations of the plurality of assets, to which departments the plurality of assets belong, and/or the like. The data identifying the business impact scores associated with the plurality of assets may be received from a system that assigns the business impact scores for each of the plurality of assets in the event an asset is lost (e.g., a business impact score provides an approximation of a criticality of an asset). The data identifying the personal identification information associated with the plurality of assets may be received from a system that tracks personal identification information (e.g., names, passwords, employee numbers, telephone numbers, and/or the like) included in the plurality of assets. The data identifying the penetration test results associated with the plurality of assets may be received from a system that executes penetration tests (e.g., for penetrating security features) for the plurality of assets and stores the penetration test results.

Figure 1B:
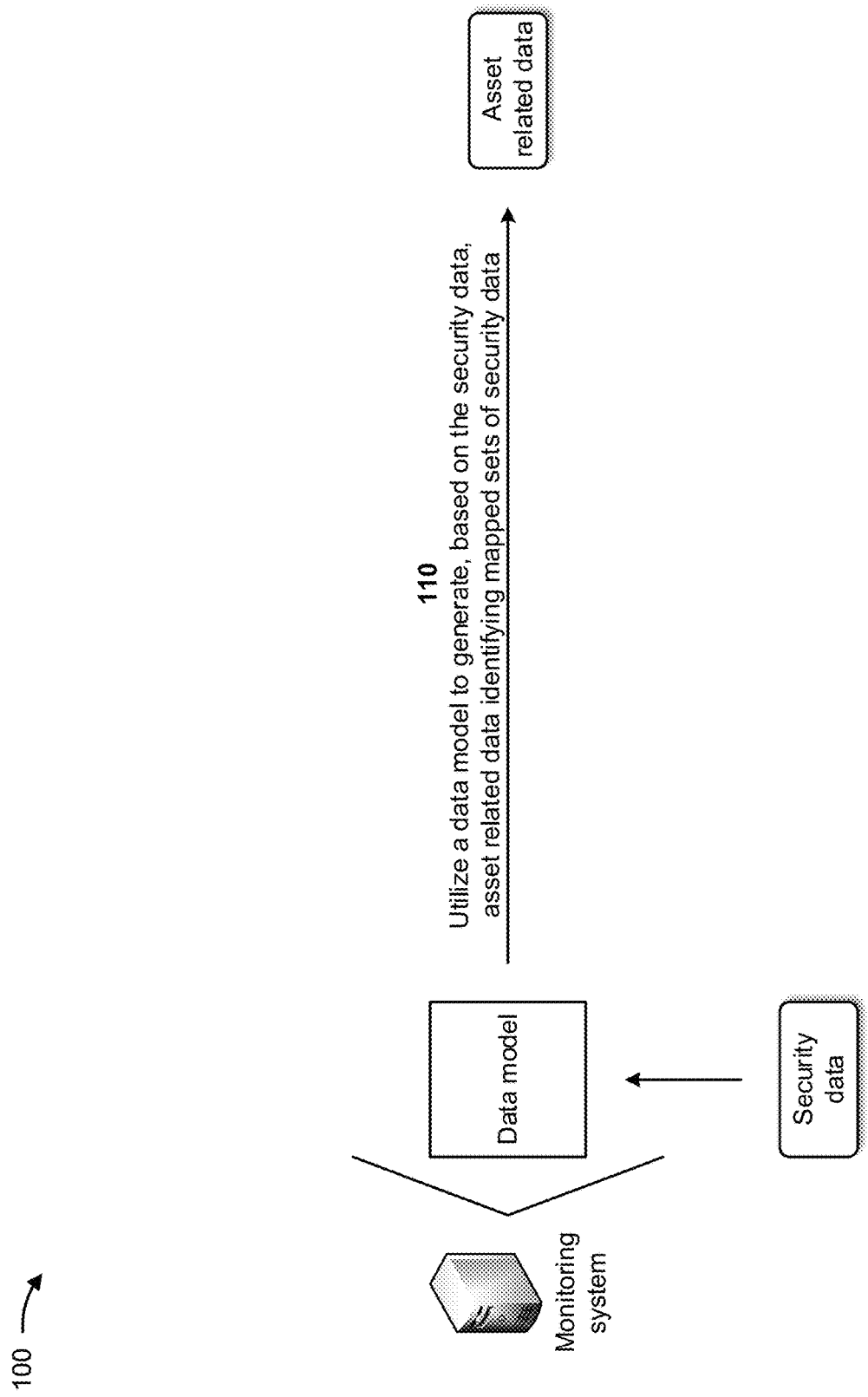

As shown in FIG. 1B, and by reference number 110, the monitoring system may utilize a data model to generate, based on the security data, asset related data identifying mapped sets of the plurality of security issues. The asset related data may provide a unified view about security risks associated with the plurality of assets by mapping the security data from diverse security systems. The asset related data may provide, for each of the plurality of assets, a criticality of an asset, a level of security risk for the asset, a security control strength of the asset, and/or the like.

In some implementations, the data model may map the data identifying the vulnerabilities associated with the plurality of assets and the data identifying the common weaknesses associated with the plurality of assets. This mapping may provide an overall vulnerability associated with each of the plurality of assets. The data model may perform the mapping based on identifiers (e.g., common vulnerabilities and exposures identifiers, or CVE-IDs) of the vulnerabilities associated with the plurality of assets. The data model may map the data identifying the vulnerabilities and the common weaknesses by processing a description of each vulnerability and each common weakness and applying text similarity to identify vulnerability and common weakness pairs.

In some implementations, the data model may map the data identifying the security threats associated with the plurality of assets and the data identifying the attack patterns associated with the security threats. This mapping may link historical security threat information with corresponding attacks used in the security threats.

In some implementations, the data model may map the data identifying the attack patterns associated with the security threats and the data identifying the vulnerabilities associated with the plurality of assets. This mapping may link security threats and/or attacks with corresponding vulnerabilities that were exploited, which may provide risk levels associated with the plurality of assets.

In some implementations, the data model may map the data identifying the common weaknesses associated with the plurality of assets and the data identifying the security controls associated with the plurality of assets. This mapping may link the plurality of assets with the security control data. The data model may map the data identifying the common weaknesses and the security controls by processing a description of each security control and each common weakness and applying text similarity to identify security control and common weakness pairs.

In some implementations, the data model may map the data identifying the asset control objectives associated with the plurality of assets and the data identifying the security controls associated with the plurality of assets. This mapping may link the asset control objectives with the security controls.

In some implementations, the data model may map the data identifying the configuration information associated with the plurality of assets and the data identifying the business impact scores associated with the plurality of assets. This mapping may link the business impact scores with the plurality of assets based on the configuration information.

In some implementations, the data model may map the data identifying the configuration information associated with the plurality of assets and the data identifying the personal identification information associated with the plurality of assets. This mapping may link the personal identification information with configuration information, which may provide indications of criticalities of the plurality of assets.

In some implementations, the data model may map the data identifying the penetration test results associated with the plurality of assets and the data identifying the security controls associated with the plurality of assets. This mapping may provide indications of strengths of the security controls for the plurality of assets.

Figure 1C:
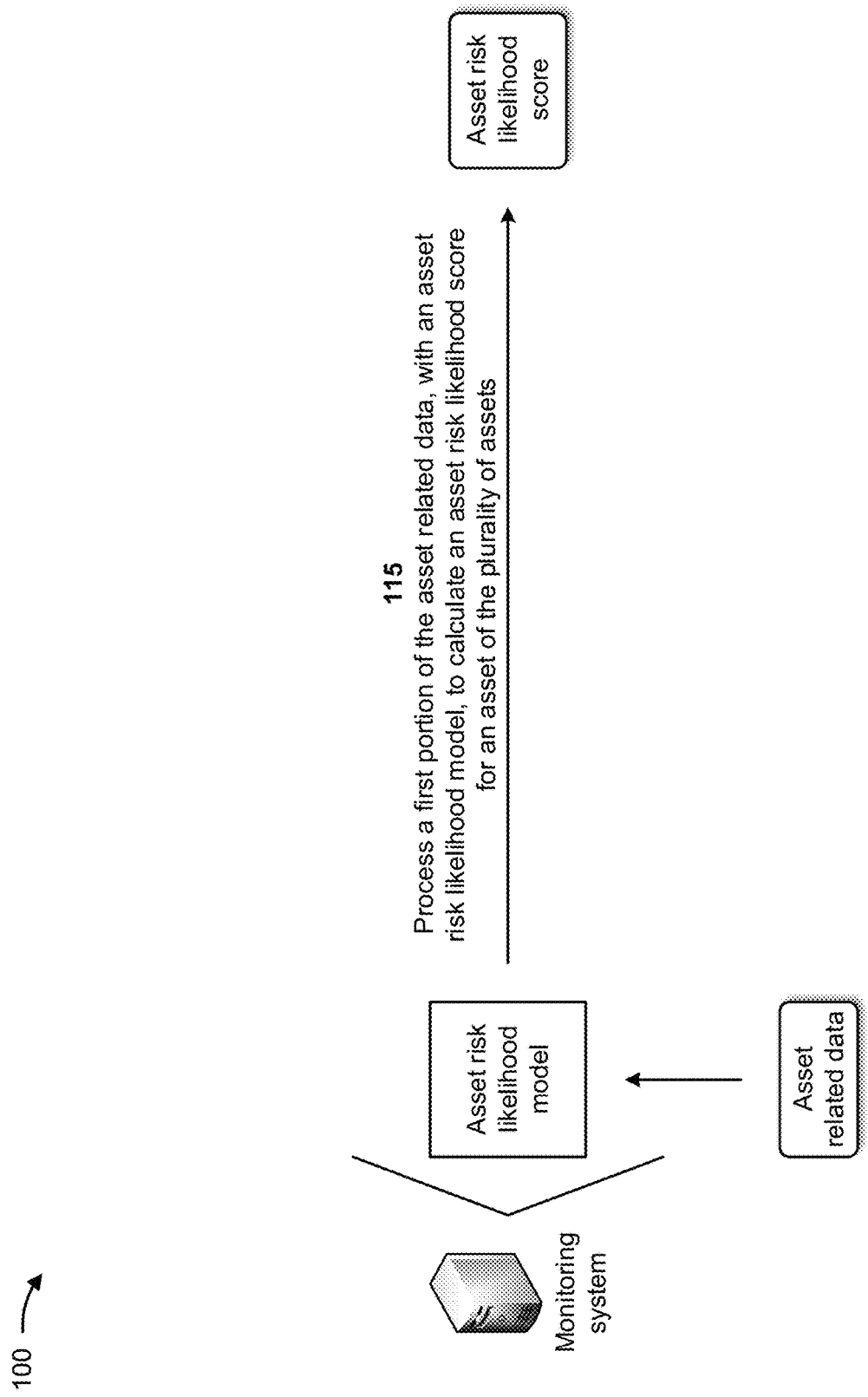

As shown in FIG. 1C, and by reference number 115, the monitoring system may process a first portion of the asset related data, with an asset risk likelihood model, to calculate an asset risk likelihood score for an asset of the plurality of assets. The first portion of the asset related data may include the data identifying the vulnerabilities associated with the asset, the security threats associated with the asset, the configuration information associated with the asset, and the mappings of the aforementioned data. When calculating the asset risk likelihood score, the asset risk likelihood model may determine prioritized vulnerabilities of the asset based on vulnerability data of the first portion of the asset related data and may determine a threat severity of the asset based on the prioritized vulnerabilities and security threat data of the first portion of the asset related data. The asset risk likelihood may calculate vulnerability risk prioritization scores for the asset based on the threat severity of the asset and may calculate the asset risk likelihood score based on the vulnerability risk prioritization scores and the configuration information associated with the asset.

The asset risk likelihood score may include an aggregation of prioritization scores of all of the vulnerabilities that are identified as being associated with the asset. Each vulnerability may be prioritized based on multiple factors, such as common vulnerability scoring system (CVSS) scores, severities of threats that might exploit a vulnerability, and/or the like.

Figure 1D:
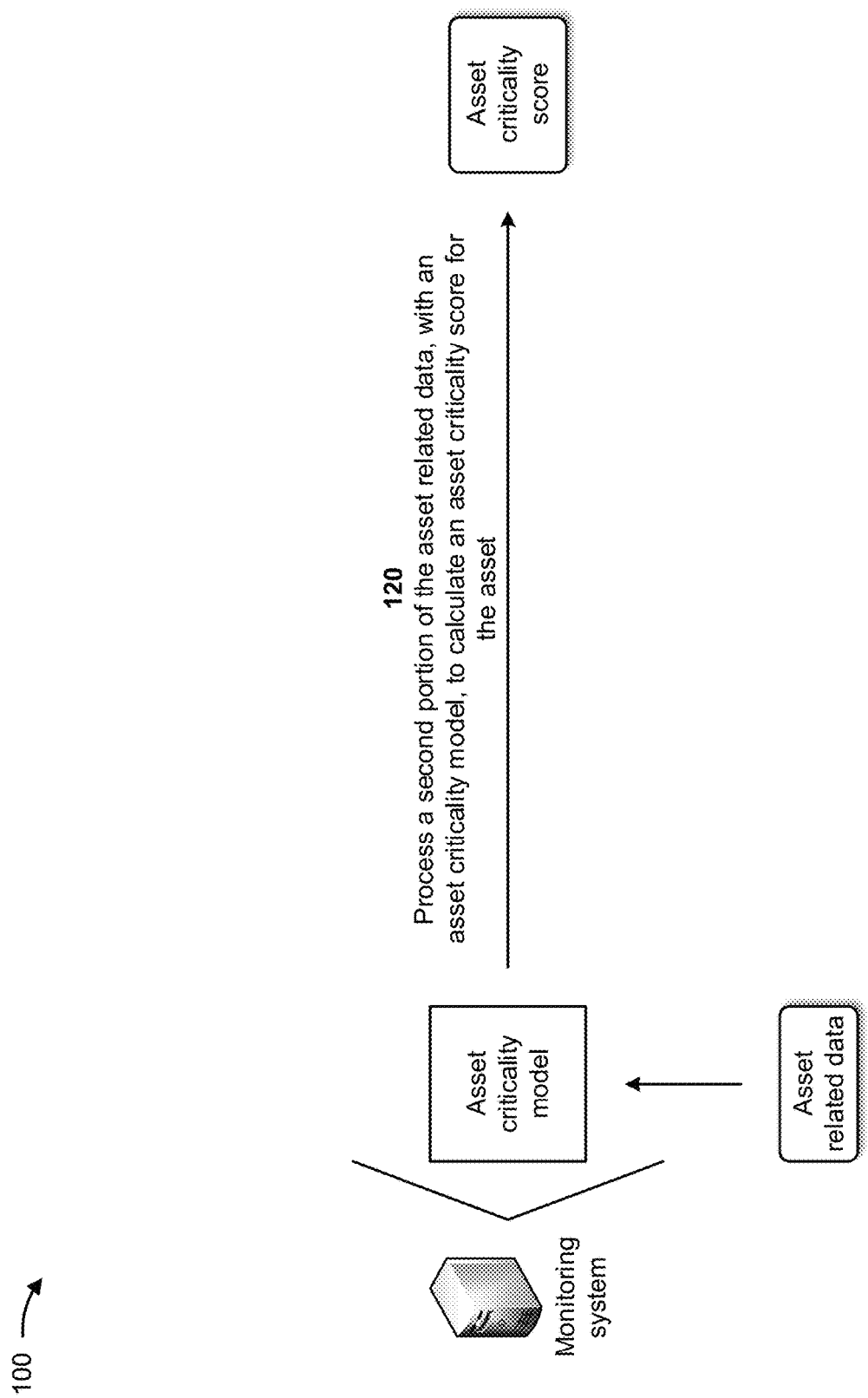

As shown in FIG. 1D, and by reference number 120, the monitoring system may process a second portion of the asset related data, with an asset criticality model, to calculate an asset criticality score for the asset. The second portion of the asset related data may include the data identifying the business impact score associated with the asset, the personal identification information associated with the asset, the configuration information associated with the asset, and the mappings of the aforementioned data. When calculating the asset criticality score, the asset criticality model may calculate an asset objective score for the asset based on the personal identification information, the configuration information, and the business impact score associated with the asset. The asset criticality model may determine a critical objective weight for the asset and may calculate the asset criticality score based on the asset objective score and the critical objective weight (e.g., by multiplying the asset objective score and the critical objective weight).

The asset criticality score may provide an indication of a criticality (e.g., a risk impact) of the asset among the plurality of assets of the entity. This may enable the entity to determine which assets are most critical to entity, to best allocate security resources to the most critical assets, to prioritize vulnerability remediation, and/or the like. The asset criticality score may provide a granular view of factors contributing to criticalities of the assets and may enable the entity to fine-tune the asset criticality score according to business objectives.

Figure 1E:
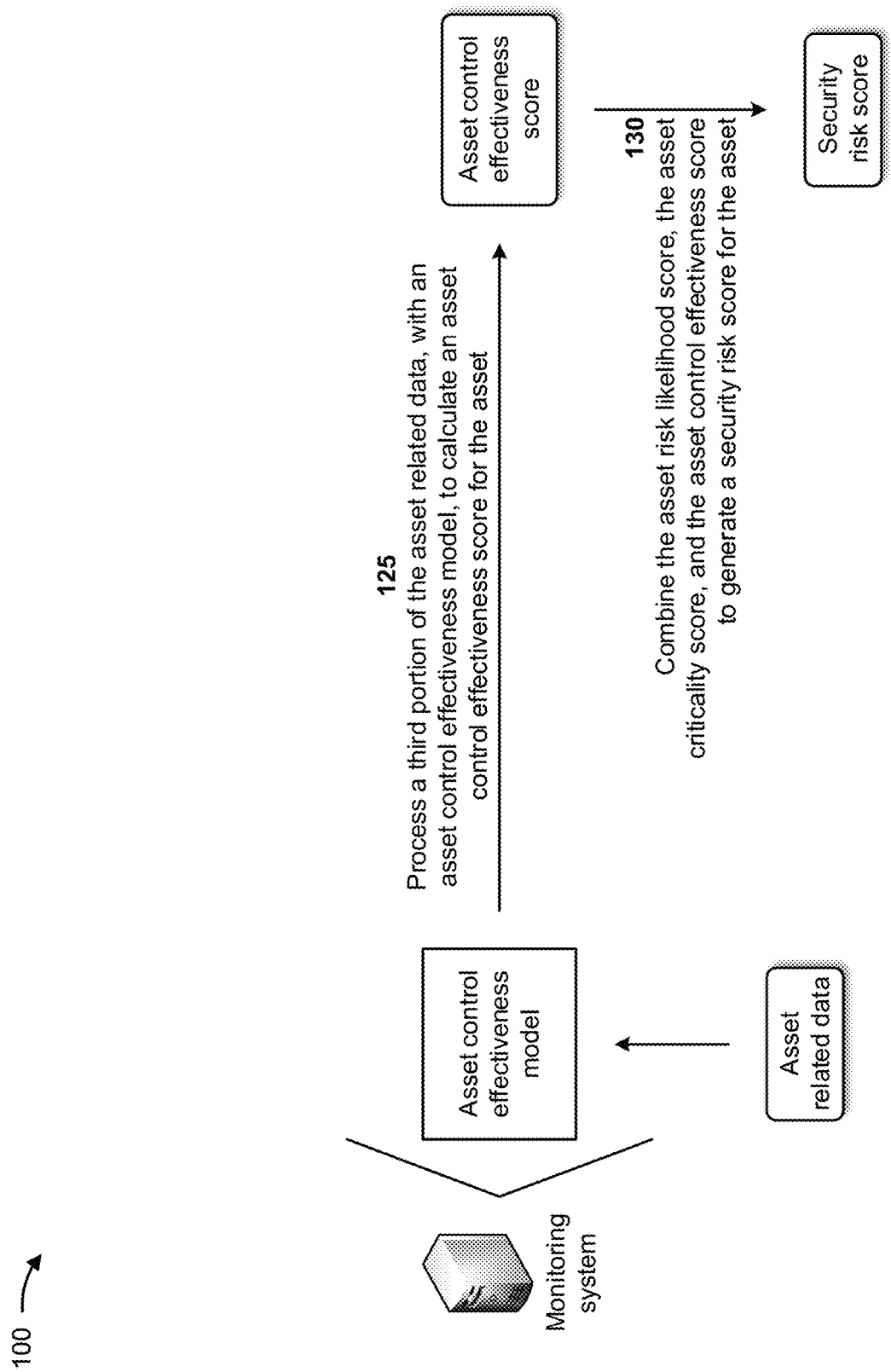

As shown in FIG. 1E, and by reference number 125, the monitoring system may process a third portion of the asset related data, with an asset control effectiveness model, to calculate an asset control effectiveness score for the asset. The third portion of the asset related data may include the data identifying the security controls associated with the asset, asset control objectives associated with the asset, configuration information associated with the asset, and the mappings of the aforementioned data. When calculating the asset control effectiveness score, the asset control effectiveness model may determine a control objective for the asset based on mapped security controls, impacts of the mapped security controls, pre-installed security controls, asset control objectives, and configuration information associated with the asset. The asset control effectiveness model may determine a security control impact for the asset based on the control objective and may determine a security control assessment for the asset based on the security control impact. The asset control effectiveness model may calculate the asset control effectiveness score based on the security control assessment. In some implementations, the asset control effectiveness model may determine a security control baseline impact weight for the asset and may determine a quantity of security control baseline impact occurrences for the asset. The asset control effectiveness model may calculate the asset control effectiveness score by multiplying the security control baseline impact weight and the quantity of security control baseline impact occurrences for the asset.

The asset control effectiveness score may provide an indication of security controls associated with the asset. The asset control effectiveness score may enable the entity to implement appropriate controls for the asset to reduce a likelihood (e.g., and an impact) of risk associated with the asset.

As further shown in FIG. 1E, and by reference number 130, the monitoring system may combine the asset risk likelihood score, the asset criticality score, and the asset control effectiveness score to generate a security risk score for the asset. For example, the monitoring system may combine the asset risk likelihood score, the asset criticality score, and the asset control effectiveness score to generate the security risk score for the asset by averaging the asset risk likelihood score, the asset criticality score, and the asset control effectiveness score to generate the security risk score.

In some implementations, the monitoring system may combine the asset risk likelihood score, the asset criticality score, and the asset control effectiveness score to generate the security risk score for the asset by applying weights to the asset risk likelihood score, the asset criticality score, and the asset control effectiveness score to generate a weighted asset risk likelihood score, a weighted asset criticality score, and a weighted asset control effectiveness score. The monitoring system may then add the weighted asset risk likelihood score, the weighted asset criticality score, and the weighted asset control effectiveness score to generate the security risk score.

Figure 1F:
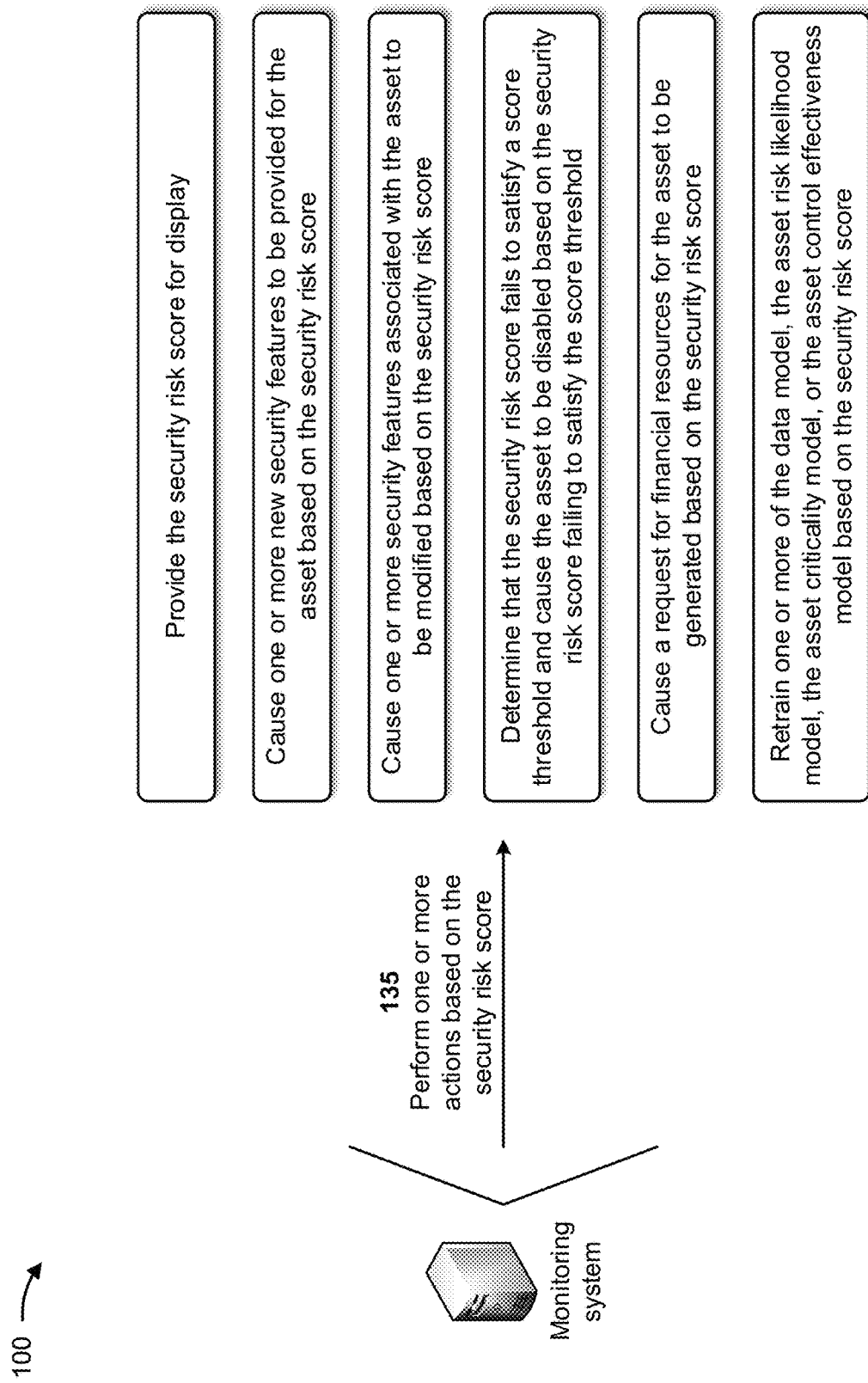

As shown in FIG. 1F, and by reference number 135, the monitoring system may perform one or more actions based on the security risk score. In some implementations, the one or more actions include the monitoring system providing the security risk score for display. For example, the monitoring system may provide the security risk score for display to an operator of the monitoring system, to a chief information security officer of the entity, to information security operators of the entity, and/or the like. Such parties may utilize the security risk score for different purposes. For example, the chief information security officer may present the security risk score to executives of the entity so that the executives may be convinced to allocate resources for the asset associated with the security risk score. In this way, the monitoring system may conserve computing resources, networking resources, and/or the like that would otherwise have been consumed in exposing a critical asset to security risks, providing an incorrect recommendation associated with security risks, losing opportunities for the business based on the asset being rendered inoperable by security risks, correcting the inoperable asset, and/or the like.

In some implementations, the one or more actions include the monitoring system causing one or more new security features to be provided for the asset based on the security risk score. For example, the monitoring system may determine that the security risk score fails to satisfy a score threshold for the asset to not be at risk of being compromised or rendered inoperable. The monitoring system may determine one or more potential new security features for the asset so that the security risk score satisfies the score threshold. The monitoring system may cause the one or more new security features to be implemented for the asset (e.g., new software installed for the asset). In this way, the monitoring system may conserve computing resources, networking resources, and/or the like that would otherwise have been consumed in exposing a critical asset to security risks, losing opportunities for the business based on the asset being rendered inoperable by security risks, correcting the inoperable asset, and/or the like.

In some implementations, the one or more actions include the monitoring system causing one or more security features associated with the asset to be modified based on the security risk score. For example, the monitoring system may determine that the security risk score fails to satisfy the score threshold for the asset to not be at risk of being compromised or rendered inoperable. The monitoring system may determine one or more security features associated with the asset that may be modified so that the security risk score satisfies the score threshold. The monitoring system may cause the one or more security features of the asset to be modified so that the asset is more secure. In this way, the monitoring system may conserve computing resources, networking resources, and/or the like that would otherwise have been consumed in exposing a critical asset to security risks, losing opportunities for the business based on the asset being rendered inoperable by security risks, correcting the inoperable asset, and/or the like.

In some implementations, the one or more actions include the monitoring system determining that the security risk score fails to satisfy a score threshold and causing the asset to be disabled based on the security risk score failing to satisfy the score threshold. For example, the monitoring system may determine that the security risk score fails to satisfy the score threshold for the asset to not be at risk of being compromised or rendered inoperable. The monitoring system may cause the asset to be disabled and corrected based on the security risk score failing to satisfy the score threshold. In this way, the monitoring system may conserve computing resources, networking resources, and/or the like that would otherwise have been consumed in exposing a critical asset to security risks, losing opportunities for the business based on the asset being rendered inoperable by security risks, and/or the like.

In some implementations, the one or more actions include the monitoring system causing a request for financial resources for the asset to be generated based on the security risk score. For example, the monitoring system may determine that the security risk score fails to satisfy the score threshold for the asset to not be at risk of being compromised or rendered inoperable. The monitoring system may generate a request for financial resources for the asset so that the asset may be improved and the security risk score for the asset may satisfy the score threshold. In this way, the monitoring system may conserve computing resources, networking resources, and/or the like that would otherwise have been consumed in exposing a critical asset to security risks, losing opportunities for the business based on the asset being rendered inoperable by security risks, and/or the like.

In some implementations, the one or more actions include the monitoring system retraining one or more of the data model, the asset risk likelihood model, the asset criticality model, or the asset control effectiveness model based on the security risk score. The monitoring system may utilize the security risk score as additional training data for retraining the one or more of the data model, the asset risk likelihood model, the asset criticality model, or the asset control effectiveness model, thereby increasing the quantity of training data available for training the one or more of the data model, the asset risk likelihood model, the asset criticality model, or the asset control effectiveness model. Accordingly, the monitoring system may conserve computing resources associated with identifying, obtaining, and/or generating historical data for training the one or more of the data model, the asset risk likelihood model, the asset criticality model, or the asset control effectiveness model relative to other systems for identifying, obtaining, and/or generating historical data for training machine learning models.

In this way, the monitoring system utilizes models to integrate data from multiple security systems and identify a security risk score for an asset. The monitoring system may provide a unified view of security risks associated with an asset of an entity by mapping data from diverse security systems (e.g., security operations data, business impact data, asset configuration data, and/or the like). The monitoring system may map the data from the security systems to identify asset level data. The monitoring system may utilize the asset level data to determine a security risk score for the asset. This, in turn, conserves computing resources, networking resources, and/or the like that would otherwise have been consumed in exposing critical assets to security risks, providing incorrect recommendations associated with security risks, losing opportunities for the business based on assets rendered inoperable by security risks, correcting the inoperable assets, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
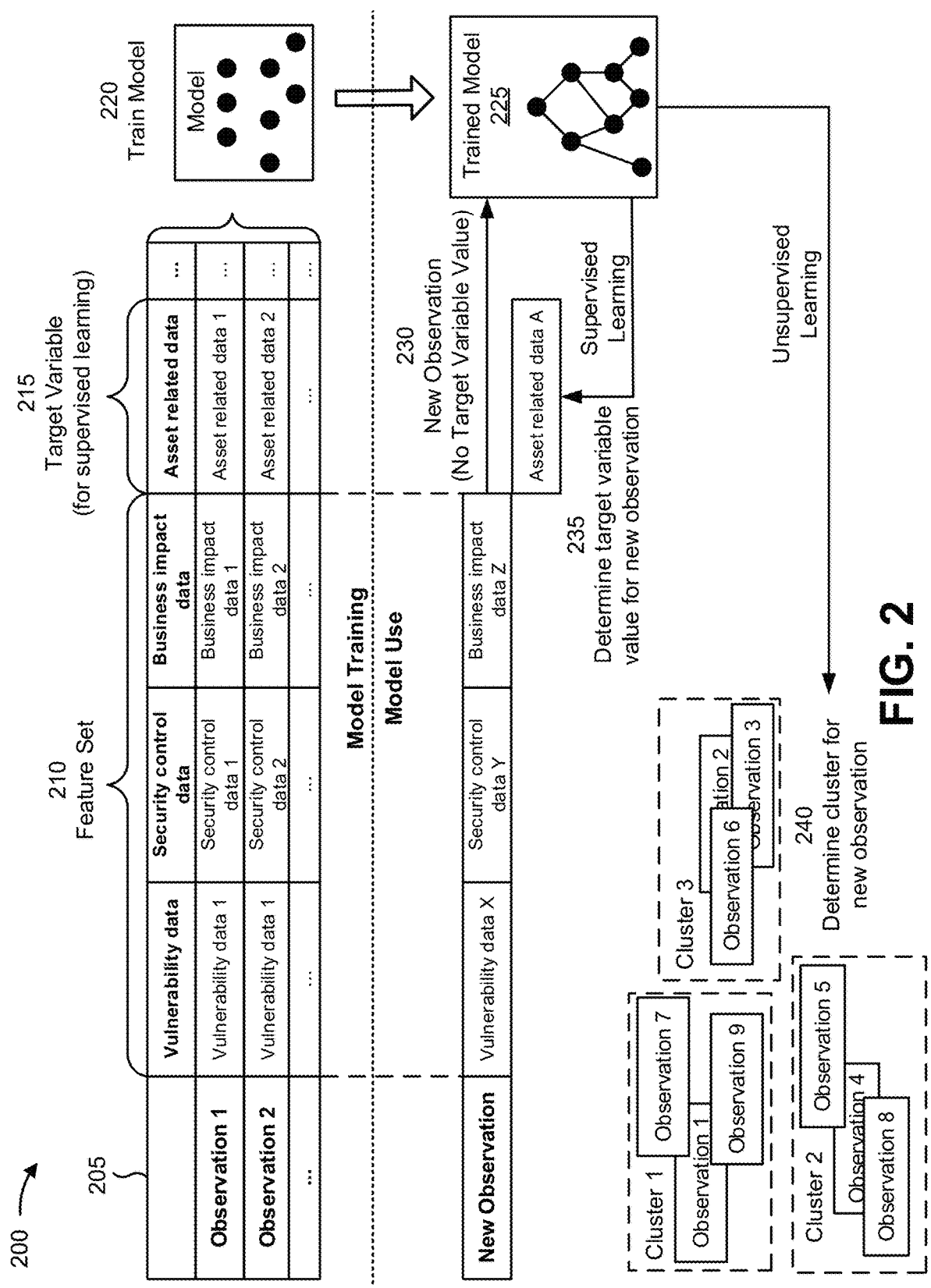
FIG. 2 is a diagram illustrating an example of training and using a machine learning model in connection with integrating data from multiple security systems and identifying a security score for an asset.

FIG. 2 is a diagram illustrating an example 200 of training and using a machine learning model in connection with integrating data from multiple security systems and identifying a security risk score for an asset. The machine learning model training and usage described herein may be performed using a machine learning system. The machine learning system may include or may be included in a computing device, a server, a cloud computing environment, and/or the like, such as the monitoring system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the monitoring system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the monitoring system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of vulnerability data, a second feature of security control data, a third feature of business impact data, and so on. As shown, for a first observation, the first feature may have a value of vulnerability data 1, the second feature may have a value of security control data 1, the third feature may have a value of business impact data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is asset related data, which has a value of asset related data 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of vulnerability data X, a second feature of security control data Y, a third feature of business impact data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of asset related data A for the target variable of the asset related data for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a vulnerability data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a security control data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to integrate data from multiple security systems and identify a security risk score for an asset. The machine learning system enables recognition and/or identification of tens, hundreds, thousands, or millions of features and/or feature values for tens, hundreds, thousands, or millions of observations, thereby increasing accuracy and consistency and reducing delay associated with integrating data from multiple security systems and identifying a security risk score for an asset relative to requiring computing resources to be allocated for tens, hundreds, or thousands of operators to manually integrate data from multiple security systems and identify a security risk score for an asset.

As indicated above, FIG. 2 is provided as an example. Other examples may differ from what is described in connection with FIG. 2.

Figure 3:
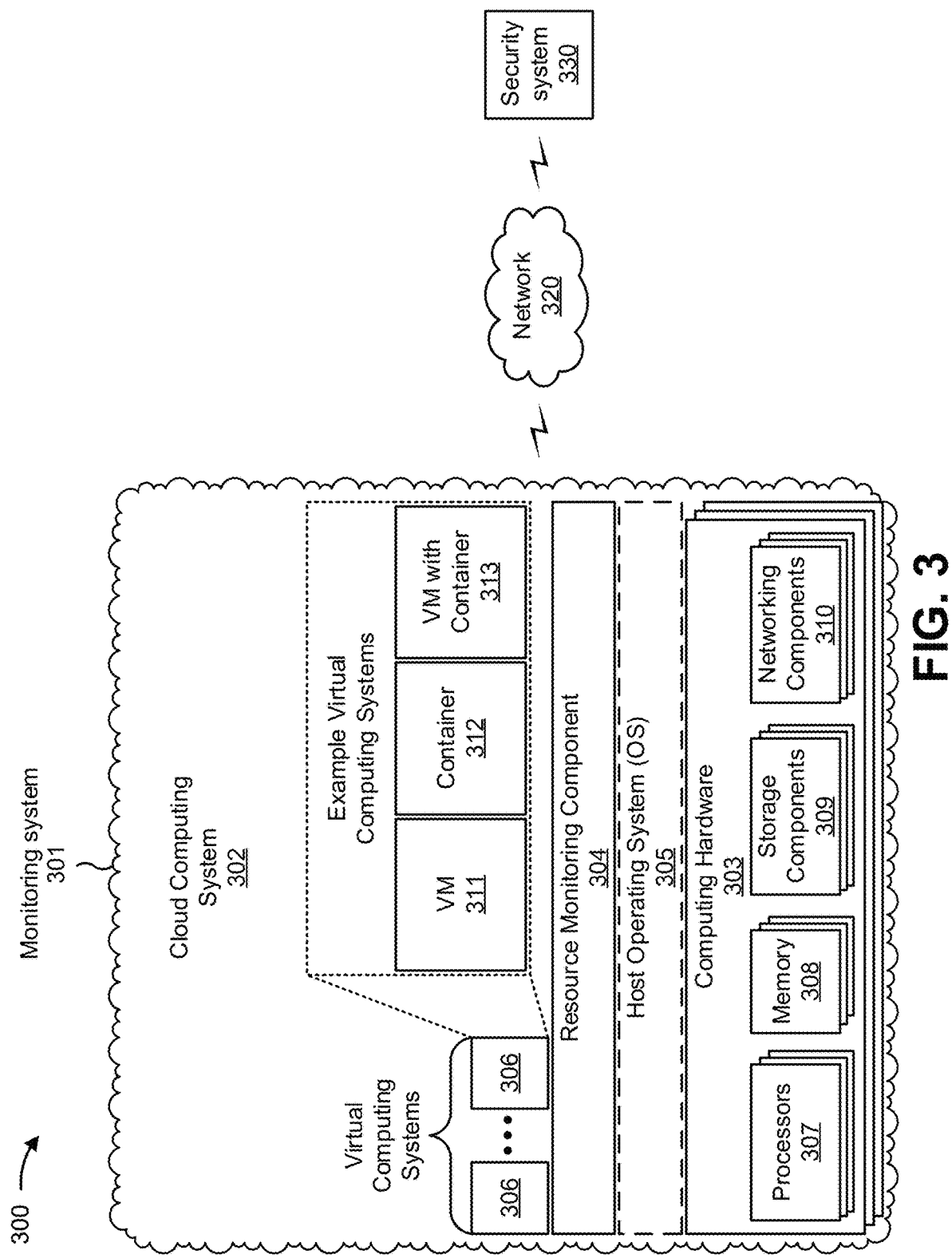
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a monitoring system 301, which may include one or more elements of and/or may execute within a cloud computing system 302. The cloud computing system 302 may include one or more elements 303-313, as described in more detail below. As further shown in FIG. 3, environment 300 may include a network 320 and/or a security system 330.

Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the monitoring system 301 may include one or more elements 303-313 of the cloud computing system 302, may execute within the cloud computing system 302, and/or may be hosted within the cloud computing system 302, in some implementations, the monitoring system 301 may not be cloud-based (e.g., may be implemented outside of a cloud computing system) or may be partially cloud-based. For example, the monitoring system 301 may include one or more devices that are not part of the cloud computing system 302, such as device 400 of FIG. 4, which may include a standalone server or another type of computing device. The monitoring system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The security system 330 includes one or more devices capable of receiving, generating, storing, processing, providing, and/or routing information, as described elsewhere herein. The security system 330 may include a communication device and/or a computing device. For example, the security system 330 may include a server, such as an application server, a client server, a web server, a database server, a host server, a proxy server, a virtual server (e.g., executing on computing hardware), or a server in a cloud computing system. In some implementations, the security system 330 includes computing hardware used in a cloud computing environment. The security system 330 may communicate with one or more other devices of the environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of environment 300.

Figure 4:
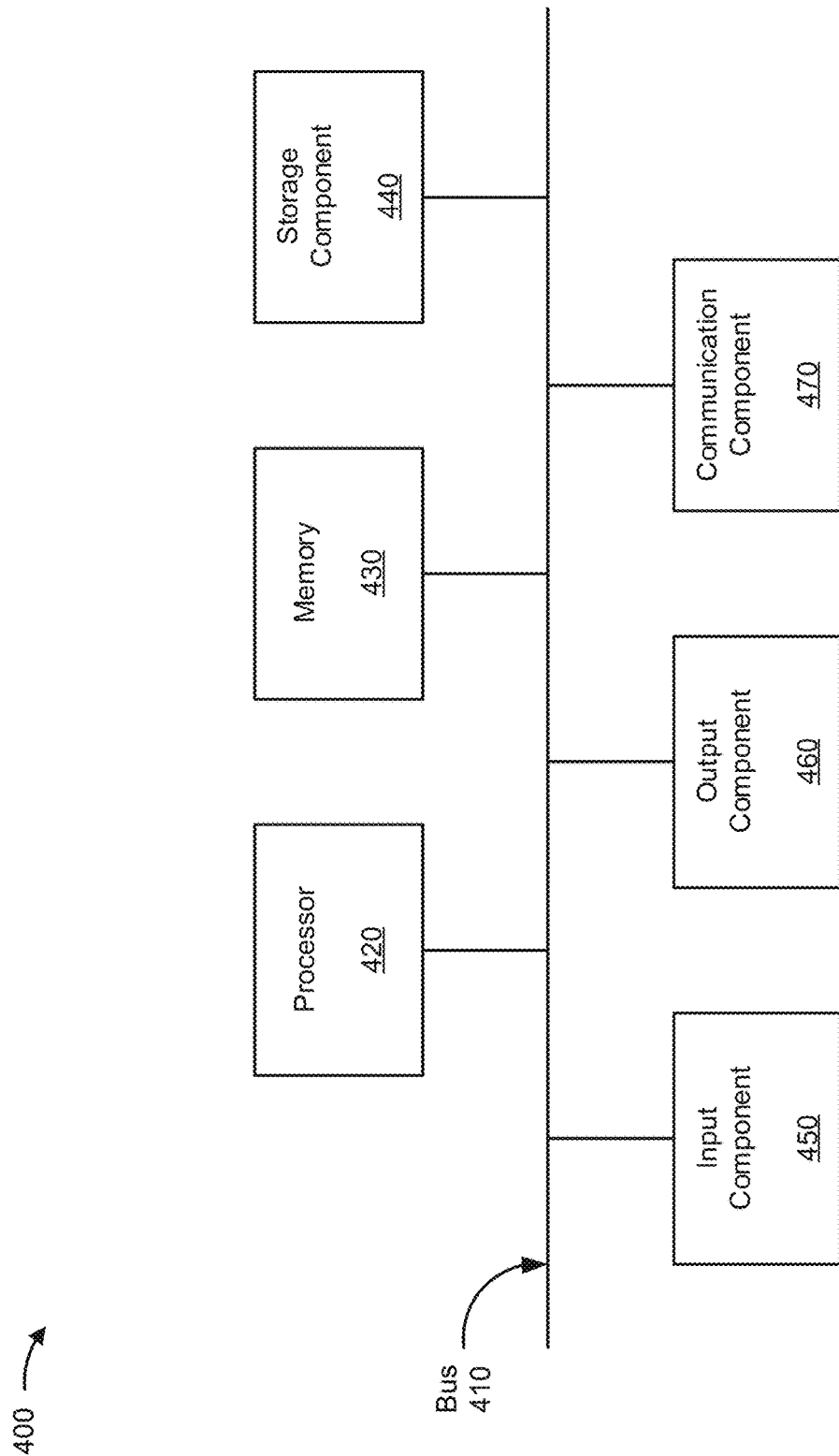
FIG. 4 is a diagram of example components of one or more devices of FIG. 3.

FIG. 4 is a diagram of example components of a device 400, which may correspond to the monitoring system 301 and/or the security system 330. In some implementations, the monitoring system 301 and/or the security system 330 may include one or more devices 400 and/or one or more components of the device 400. As shown in FIG. 4, the device 400 may include a bus 410, a processor 420, a memory 430, a storage component 440, an input component 450, an output component 460, and a communication component 470.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The storage component 440 stores information and/or software related to the operation of the device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables the device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, an actuator, and/or the like. The output component 460 enables the device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, an antenna, and/or the like.

The device 400 may perform one or more processes described herein. For example, a non-transitory computer-readable medium (e.g., the memory 430 and/or the storage component 440) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
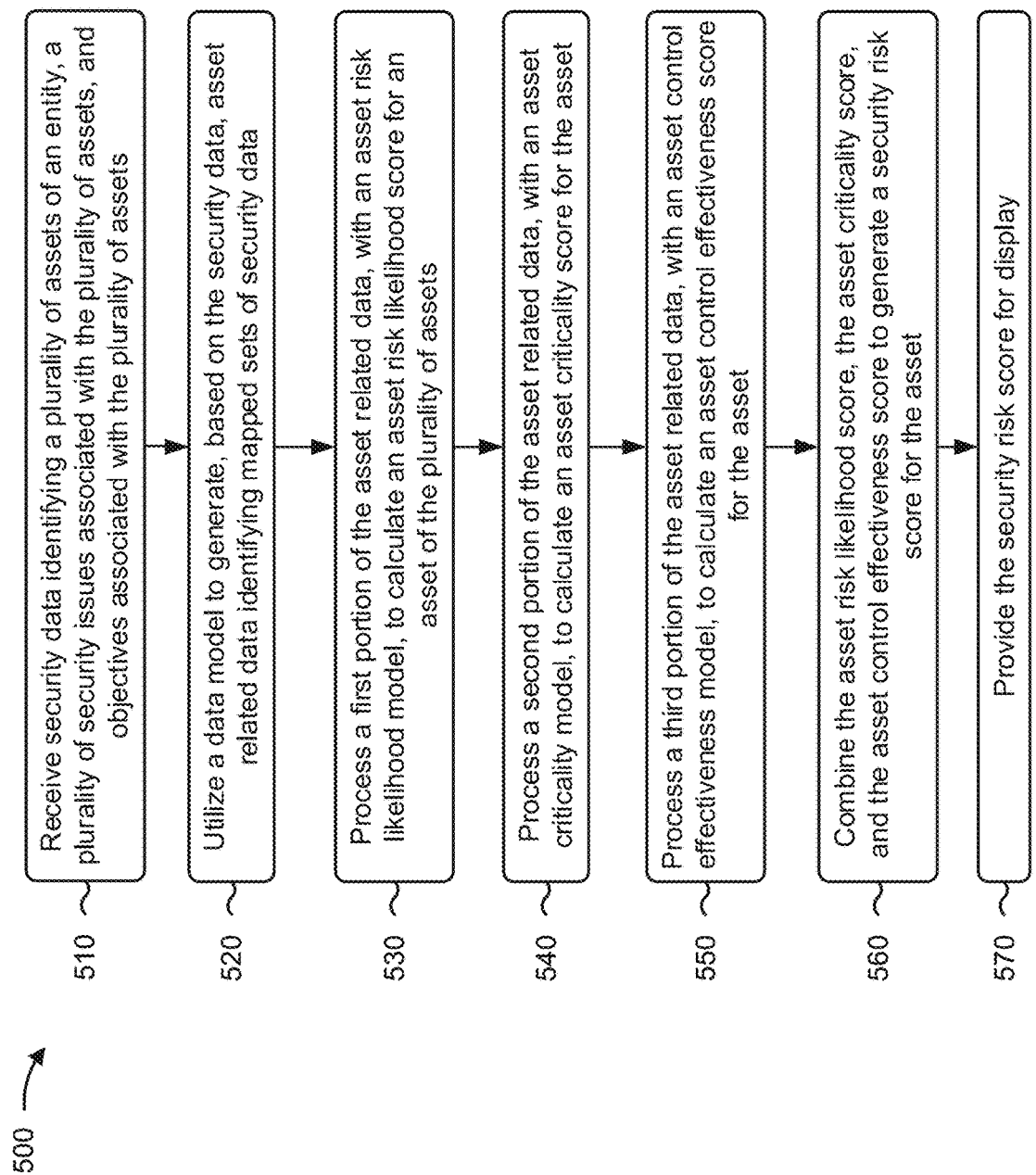
FIG. 5 is a flowchart of an example process for utilizing models to integrate data from multiple security systems and identify a security risk score for an asset.

FIG. 5 is a flowchart of an example process 500 for utilizing models to integrate data from multiple security systems and identify a security risk score for an asset. In some implementations, one or more process blocks of FIG. 5 may be performed by a device (e.g., the monitoring system 301). In some implementations, one or more process blocks of FIG. 5 may be performed by another device or a group of devices separate from or including the device, such as a security system (e.g., the security system 330). Additionally, or alternatively, one or more process blocks of FIG. 5 may be performed by one or more components of the device 400, such as the processor 420, the memory 430, the storage component 440, the input component 450, the output component 460, and/or the communication component 470.

As shown in FIG. 5, process 500 may include receiving security data identifying a plurality of assets of an entity, a plurality of security issues associated with the plurality of assets, and objectives associated with the plurality of assets (block 510). For example, the device may receive security data identifying a plurality of assets of an entity, a plurality of security issues associated with the plurality of assets, and objectives associated with the plurality of assets, as described above. In some implementations, the security data includes data identifying one or more of vulnerabilities associated with the plurality of assets, common weaknesses associated with the plurality of assets, security threats associated with the plurality of assets, attacking patterns associated with the security threats, security controls associated with the plurality of assets, control objectives associated with the plurality of assets, configuration information associated with the plurality of assets, business impact scores associated with the plurality of assets, personal identification information associated with the plurality of assets, or penetration test results associated with the plurality of assets.

As further shown in FIG. 5, process 500 may include utilizing a data model to generate, based on the security data, asset related data identifying mapped sets of security data (block 520). For example, the device may utilize a data model to generate, based on the security data, asset related data identifying mapped sets of security data, as described above.

In some implementations, utilizing the data model to generate, based on the security data, the asset related data identifying the mapped sets of security data includes one or more of mapping data identifying vulnerabilities associated with the plurality of assets and data identifying common weaknesses associated with the plurality of assets to generate one of the sets; mapping data identifying security threats associated with the plurality of assets and data identifying attack patterns associated with the security threats to generate one of the sets; mapping the data identifying attack patterns and the data identifying the vulnerabilities associated with the plurality of assets to generate one of the sets; mapping the data identifying the common weaknesses associated with the plurality of assets and data identifying security controls associated with the plurality of assets to generate one of the sets; mapping data identifying asset control objectives associated with the plurality of assets and the data identifying the security controls associated with the plurality of assets to generate one of the sets; mapping data identifying configuration information associated with the plurality of assets and data identifying business impact scores associated with the plurality of assets to generate one of the sets; mapping personal identification information associated with the plurality of assets and the data identifying the configuration information associated with the plurality of assets to generate one of the sets; or mapping data identifying penetration test results associated with the plurality of assets and the data identifying the security controls associated with the plurality of assets to generate one of the sets.

In some implementations, utilizing the data model to generate, based on the security data, the asset related data identifying the mapped sets of security data includes mapping the security data identifying the plurality of assets, the plurality of security issues, and the objectives to generate the mapped sets of security data.

As further shown in FIG. 5, process 500 may include processing a first portion of the asset related data, with an asset risk likelihood model, to calculate an asset risk likelihood score for an asset of the plurality of assets (block 530). For example, the device may process a first portion of the asset related data, with an asset risk likelihood model, to calculate an asset risk likelihood score for an asset of the plurality of assets, as described above. In some implementations, processing the first portion of the asset related data, with the asset risk likelihood model, to calculate the asset risk likelihood score includes determining prioritized vulnerabilities of the asset based on vulnerability data of the first portion of the asset related data; determining a threat severity of the asset based on the prioritized vulnerabilities and threat data of the first portion of the asset related data; calculating vulnerability risk prioritization scores for the asset based on the threat severity; and calculating the asset risk likelihood score based on the vulnerability risk prioritization scores.

As further shown in FIG. 5, process 500 may include processing a second portion of the asset related data, with an asset criticality model, to calculate an asset criticality score for the asset (block 540). For example, the device may process a second portion of the asset related data, with an asset criticality model, to calculate an asset criticality score for the asset, as described above. In some implementations, processing the second portion of the asset related data, with the asset criticality model, to calculate the asset criticality score includes calculating an asset objective score for the asset based on personal identification information, configuration information, and a business impact score of the second portion of the asset related data; determining a critical objective weight for the asset; and calculating the asset criticality score based on the asset objective score and the critical objective weight.

As further shown in FIG. 5, process 500 may include processing a third portion of the asset related data, with an asset control effectiveness model, to calculate an asset control effectiveness score for the asset (block 550). For example, the device may process a third portion of the asset related data, with an asset control effectiveness model, to calculate an asset control effectiveness score for the asset, as described above. In some implementations, processing the third portion of the asset related data, with the asset control effectiveness model, to calculate the asset control effectiveness score includes determining a control objective for the asset based on mapped security controls, impacts of the mapped security controls, and pre-installed security controls of the third portion of the asset related data; determining a security control impact for the asset based on the control objective; determining a security control assessment for the asset based on the security control impact; and calculating the asset control effectiveness score based on the security control assessment.

In some implementations, the asset risk likelihood score is based on an aggregation of vulnerabilities associated with the asset, the asset criticality score provides an indication of a criticality of the asset among the plurality of assets of the entity, and the asset control effectiveness score provides an indication of security controls associated with the asset.

As further shown in FIG. 5, process 500 may include combining the asset risk likelihood score, the asset criticality score, and the asset control effectiveness score to generate a security risk score for the asset (block 560). For example, the device may combine the asset risk likelihood score, the asset criticality score, and the asset control effectiveness score to generate a security risk score for the asset, as described above. In some implementations, combining the asset risk likelihood score, the asset criticality score, and the asset control effectiveness score to generate the security risk score includes averaging the asset risk likelihood score, the asset criticality score, and the asset control effectiveness score to generate the security risk score.

In some implementations, combining the asset risk likelihood score, the asset criticality score, and the asset control effectiveness score to generate the security risk score includes applying weights to the asset risk likelihood score, the asset criticality score, and the asset control effectiveness score to generate a weighted asset risk likelihood score, a weighted asset criticality score, and a weighted asset control effectiveness score; and adding the weighted asset risk likelihood score, the weighted asset criticality score, and the weighted asset control effectiveness score to generate the security risk score.

As further shown in FIG. 5, process 500 may include providing the security risk score for display (block 570). For example, the device may provide the security risk score for display, as described above. In some implementations, performing the one or more actions includes one or more of providing the security risk score for display, causing one or more new security features to be provided for the asset based on the security risk score, or causing one or more security features associated with the asset to be modified based on the security risk score. In some implementations, performing the one or more actions includes one or more of causing a request for financial resources for the asset to be generated based on the security risk score, or retraining one or more of the data model, the asset risk likelihood model, the asset criticality model, or the asset control effectiveness model based on the security risk score. In some implementations, performing the one or more actions includes determining that the security risk score fails to satisfy a score threshold, and causing the asset to be disabled based on the security risk score failing to satisfy the score threshold.

Process 500 may include additional implementations, such as any single implementation or any combination of implementations described below and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, security data identifying a plurality of assets of an entity, a plurality of security issues associated with the plurality of assets, and objectives associated with the plurality of assets;
   utilizing, by the device, a data model to generate, based on the security data, asset related data identifying mapped sets of security data;
   processing, by the device, a first portion of the asset related data, with an asset risk likelihood model, to calculate an asset risk likelihood score for an asset of the plurality of assets;
   processing, by the device, a second portion of the asset related data, with an asset criticality model, to calculate an asset criticality score for the asset;
   processing, by the device, a third portion of the asset related data, with an asset control effectiveness model, to calculate an asset control effectiveness score for the asset;
   combining, by the device, the asset risk likelihood score, the asset criticality score, and the asset control effectiveness score to generate a security risk score for the asset; and
   providing, by the device, the security risk score for display.

2. The method of claim 1, wherein the security data includes data identifying one or more of:
   vulnerabilities associated with the plurality of assets,
   common weaknesses associated with the plurality of assets,
   security threats associated with the plurality of assets,
   attack patterns associated with the security threats,
   security controls associated with the plurality of assets,
   asset control objectives associated with the plurality of assets, configuration information associated with the plurality of assets, business impact scores associated with the plurality of assets, personal identification information associated with the plurality of assets, or penetration test results associated with the plurality of assets.

3. The method of claim 1, wherein utilizing the data model to generate, based on the security data, the asset related data identifying the mapped sets of security data comprises one or more of:

mapping data identifying vulnerabilities associated with the plurality of assets and data identifying common weaknesses associated with the plurality of assets to generate one of the sets;

mapping data identifying security threats associated with the plurality of assets and data identifying attack patterns associated with the security threats to generate one of the sets;

mapping the data identifying attack patterns and the data identifying the vulnerabilities associated with the plurality of assets to generate one of the sets;

mapping the data identifying the common weaknesses associated with the plurality of assets and data identifying security controls associated with the plurality of assets to generate one of the sets;

mapping data identifying asset control objectives associated with the plurality of assets and the data identifying the security controls associated with the plurality of assets to generate one of the sets;

mapping data identifying configuration information associated with the plurality of assets and data identifying business impact scores associated with the plurality of assets to generate one of the sets;

mapping personal identification information associated with the plurality of assets and the data identifying the configuration information associated with the plurality of assets to generate one of the sets; or mapping data identifying penetration test results associated with the plurality of assets and the data identifying the security controls associated with the plurality of assets to generate one of the sets.

4. The method of claim 1, wherein processing the first portion of the asset related data, with the asset risk likelihood model, to calculate the asset risk likelihood score comprises:

determining prioritized vulnerabilities of the asset based on vulnerability data of the first portion of the asset related data;

determining a threat severity of the asset based on the prioritized vulnerabilities and threat data of the first portion of the asset related data;

calculating vulnerability risk prioritization scores for the asset based on the threat severity; and calculating the asset risk likelihood score based on the vulnerability risk prioritization scores.

5. The method of claim 1, wherein processing the second portion of the asset related data, with the asset criticality model, to calculate the asset criticality score comprises:

calculating an asset objective score for the asset based on personal identification information, configuration information, and a business impact score of the second portion of the asset related data;

determining a critical objective weight for the asset; and calculating the asset criticality score based on the asset objective score and the critical objective weight.

6. The method of claim 1, wherein processing the third portion of the asset related data, with the asset control effectiveness model, to calculate the asset control effectiveness score comprises:

determining a control objective for the asset based on mapped security controls, impacts of the mapped security controls, and pre-installed security controls of the third portion of the asset related data;

determining a security control impact for the asset based on the control objective;

determining a security control assessment for the asset based on the security control impact; and calculating the asset control effectiveness score based on the security control assessment.

7. The method of claim 1, wherein combining the asset risk likelihood score, the asset criticality score, and the asset control effectiveness score to generate the security risk score comprises:

averaging the asset risk likelihood score, the asset criticality score, and the asset control effectiveness score to generate the security risk score.

8. A device, comprising:

one or more memories; and one or more processors, coupled to the one or more memories, configured to:

receive security data identifying a plurality of assets of an entity, a plurality of security issues associated with the plurality of assets, and objectives associated with the plurality of assets;

utilize a data model to generate, based on the security data, asset related data identifying mapped sets of security data;

process a first portion of the asset related data, with an asset risk likelihood model, to calculate an asset risk likelihood score for an asset of the plurality of assets;

process a second portion of the asset related data, with an asset criticality model, to calculate an asset criticality score for the asset;

process a third portion of the asset related data, with an asset control effectiveness model, to calculate an asset control effectiveness score for the asset;

combine the asset risk likelihood score, the asset criticality score, and the asset control effectiveness score to generate a security risk score for the asset; and perform one or more actions based on the security risk score.

9. The device of claim 8, wherein the one or more processors, to combine the asset risk likelihood score, the asset criticality score, and the asset control effectiveness score to generate the security risk score, are configured to:

apply weights to the asset risk likelihood score, the asset criticality score, and the asset control effectiveness score to generate a weighted asset risk likelihood score, a weighted asset criticality score, and a weighted asset control effectiveness score; and add the weighted asset risk likelihood score, the weighted asset criticality score, and the weighted asset control effectiveness score to generate the security risk score.

10. The device of claim 8, wherein the one or more processors, to perform the one or more actions, are configured to one or more of:

provide the security risk score for display;

cause one or more new security features to be provided for the asset based on the security risk score; or cause one or more security features associated with the asset to be modified based on the security risk score.

11. The device of claim 8, wherein the one or more processors, to perform the one or more actions, are configured to one or more of:
cause a request for financial resources for the asset to be generated based on the security risk score; or
retrain one or more of the data model, the asset risk likelihood model, the asset criticality model, or the asset control effectiveness model based on the security risk score.

12. The device of claim 8, wherein the one or more processors, to perform the one or more actions, are configured to:
determine that the security risk score fails to satisfy a score threshold; and
cause the asset to be disabled based on the security risk score failing to satisfy the score threshold.

13. The device of claim 8, wherein the asset risk likelihood score is based on an aggregation of vulnerabilities associated with the asset,
wherein the asset criticality score provides an indication of a criticality of the asset among the plurality of assets of the entity, and
wherein the asset control effectiveness score provides an indication of security controls associated with the asset.

14. The device of claim 8, wherein the one or more processors, to utilize the data model to generate, based on the security data, the asset related data identifying the mapped sets of security data, are configured to:
map the security data identifying the plurality of assets, the plurality of security issues, and the objectives to generate the mapped sets of security data.

15. A non-transitory computer-readable medium storing a set of instructions, the set of instructions comprising:
one or more instructions that, when executed by one or more processors of a device, cause the device to:
receive security data identifying a plurality of assets of an entity, a plurality of security issues associated with the plurality of assets, and objectives associated with the plurality of assets,
wherein the security data includes data identifying one or more of:
vulnerabilities associated with the plurality of assets,
common weaknesses associated with the plurality of assets,
security threats associated with the plurality of assets,
attack patterns associated with the security threats,
security controls associated with the plurality of assets,
asset control objectives associated with the plurality of assets,
configuration information associated with the plurality of assets,
business impact scores associated with the plurality of assets,
personal identification information associated with the plurality of assets, or
penetration test results associated with the plurality of assets;
utilize a data model to generate, based on the security data, asset related data identifying mapped sets of security data;
process a first portion of the asset related data, with an asset risk likelihood model, to calculate an asset risk likelihood score for an asset of the plurality of assets;
process a second portion of the asset related data, with an asset criticality model, to calculate an asset criticality score for the asset;
process a third portion of the asset related data, with an asset control effectiveness model, to calculate an asset control effectiveness score for the asset;
combine the asset risk likelihood score, the asset criticality score, and the asset control effectiveness score to generate a security risk score for the asset; and
perform one or more actions based on the security risk score.

16. The non-transitory computer-readable medium of claim 15, wherein the one or more instructions, that cause the device to utilize the data model to generate, based on the security data, the asset related data identifying the mapped sets of security data, cause the device to:
map data identifying vulnerabilities associated with the plurality of assets and data identifying common weaknesses associated with the plurality of assets to generate one of the sets;
map data identifying security threats associated with the plurality of assets and data identifying attack patterns associated with the security threats to generate one of the sets;
map the data identifying attack patterns and the data identifying the vulnerabilities associated with the plurality of assets to generate one of the sets;
map the data identifying the common weaknesses associated with the plurality of assets and data identifying security controls associated with the plurality of assets to generate one of the sets;
map data identifying asset control objectives associated with the plurality of assets and the data identifying the security controls associated with the plurality of assets to generate one of the sets;
map data identifying configuration information associated with the plurality of assets and data identifying business impact scores associated with the plurality of assets to generate one of the sets;
map personal identification information associated with the plurality of assets and the data identifying the configuration information associated with the plurality of assets to generate one of the sets; or
map data identifying penetration test results associated with the plurality of assets and the data identifying the security controls associated with the plurality of assets to generate one of the sets.

17. The non-transitory computer-readable medium of claim 15, wherein the one or more instructions, that cause the device to process the first portion of the asset related data, with the asset risk likelihood model, to calculate the asset risk likelihood score, cause the device to:
determine prioritized vulnerabilities of the asset based on vulnerability data of the first portion of the asset related data;
determine a threat severity of the asset based on the prioritized vulnerabilities and threat data of the first portion of the asset related data;
calculate vulnerability risk prioritization scores for the asset based on the threat severity; and
calculate the asset risk likelihood score based on the vulnerability risk prioritization scores.

18. The non-transitory computer-readable medium of claim 15, wherein the one or more instructions, that cause the device to process the second portion of the asset related data, with the asset criticality model, to calculate the asset criticality score, cause the device to:

calculate an asset objective score for the asset based on personal identification information, configuration information, and a business impact score of the second portion of the asset related data;

determine a critical objective weight for the asset; and calculate the asset criticality score based on the asset objective score and the critical objective weight.

19. The non-transitory computer-readable medium of claim 15, wherein the one or more instructions, that cause the device to process the third portion of the asset related data, with the asset control effectiveness model, to calculate the asset control effectiveness score, cause the device to:

determine a control objective for the asset based on mapped security controls, impacts of the mapped security controls, and pre-installed security controls of the third portion of the asset related data;

determine a security control impact for the asset based on the control objective;

determine a security control assessment for the asset based on the security control impact; and calculate the asset control effectiveness score based on the security control assessment.

20. The non-transitory computer-readable medium of claim 15, wherein the one or more instructions, that cause the device to perform the one or more actions, cause the device to one or more of:

provide the security risk score for display;

cause one or more new security features to be provided for the asset based on the security risk score;

cause one or more security features associated with the asset to be modified based on the security risk score;

cause a request for financial resources for the asset to be generated based on the security risk score;

retrain one or more of the data model, the asset risk likelihood model, the asset criticality model, or the asset control effectiveness model based on the security risk score; or cause the asset to be disabled based on the security risk score.

* * * * *